United States Patent [19]

Loftus, Jr.

[11] Patent Number: 5,274,543
[45] Date of Patent: Dec. 28, 1993

[54] ZERO-VOLTAGE SWITCHING POWER CONVERTER WITH LOSSLESS SYNCHRONOUS RECTIFIER GATE DRIVE

[75] Inventor: Thomas P. Loftus, Jr., Mesquite, Tex.

[73] Assignee: AT&T Bell Laboratories, Murray Hill, Pa.

[21] Appl. No.: 949,603

[22] Filed: Sep. 23, 1992

Related U.S. Application Data

[63] Continuation-in-part of Ser. No. 871,364, Apr. 20, 1992.

[51] Int. Cl.$^5$ .......................................... H02M 7/217
[52] U.S. Cl. ..................................... 363/127; 363/89; 363/17
[58] Field of Search ............................ 363/17, 89, 127

[56] References Cited

U.S. PATENT DOCUMENTS

| | | | |
|---|---|---|---|
| 4,399,499 | 8/1983 | Butcher et al. | 363/17 |
| 4,519,024 | 5/1985 | Federico et al. | 363/127 |
| 4,716,514 | 12/1987 | Patel | 363/127 |
| 4,814,962 | 3/1989 | Magalhaes et al. | |
| 4,870,555 | 9/1989 | White | 363/127 X |
| 4,922,404 | 5/1990 | Ludwig et al. | 363/89 |
| 5,029,062 | 7/1991 | Capel | 363/26 |
| 5,179,512 | 1/1993 | Fisher et al. | 363/127 |

OTHER PUBLICATIONS

"Twelfth International Telecommunications Energy Conference" Intelec, Oct. 21-25, 1990, pp. i-185.

*Primary Examiner*—Emanuel T. Voeltz
*Attorney, Agent, or Firm*—Alfred G. Steinmetz

[57] ABSTRACT

A converter operating in a resonant mode of operation is used as an off-line switching power supply operating with a high power density. A drive arrangement and operative scheme for driving the power switching transistors limits the dissipation losses within the power switching transistors. Drive circuitry drives two power switching transistors with unequal duty cycles having conducting durations such that the sum of the conduction intervals substantially equals the combined switching period of the two power switching transistors. These conducting intervals are separated by very short dead time intervals controlled by the differing turn-on and turn-off times of the two power switching transistors. The short interval between alternate conductions of the two power switching transistors is sufficient in duration to allow zero voltage turn on of the power switching transistors but short enough in duration to minimize power loss and conducted noise. In the illustrative embodiment the dead time is at least an order of magnitude less than the time interval of the shortest duty cycle. Regulation of the output of the converter is attained by adjusting the ratio of the first and second duty cycles or conducting intervals.

A Synchronous rectifier, suitable for a converter having minimum dead time between conduction of the two switching devices, comprises MOSFET rectifying devices which are driven in a zero voltage switching mode so that the charging and discharging of the MOSFET gate capacitances are lossless.

9 Claims, 6 Drawing Sheets

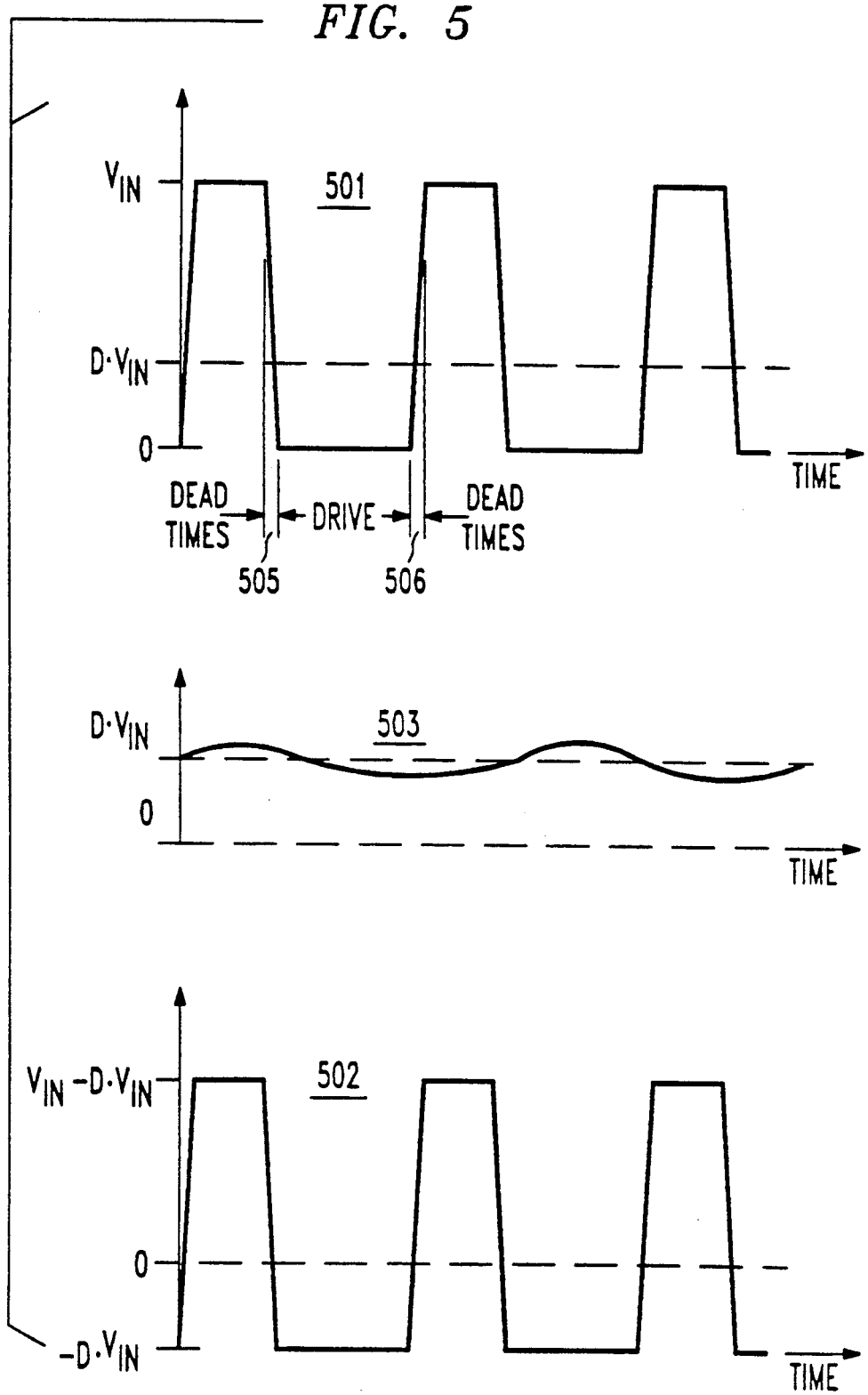

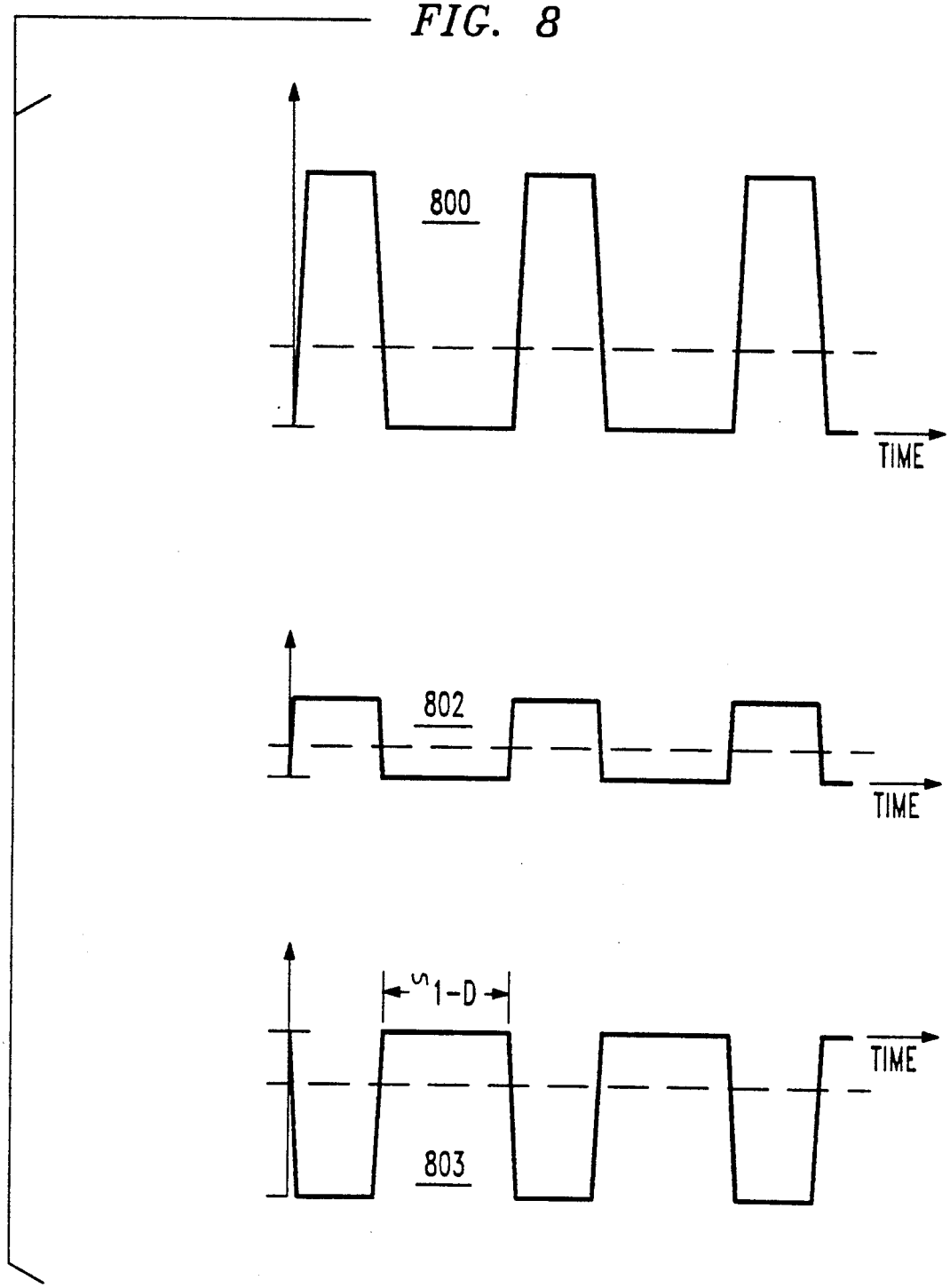

ZERO-VOLTAGE SWITCHING POWER CONVERTER WITH LOSSLESS SYNCHRONOUS RECTIFIER GATE DRIVE

This application is a continuation in part of application Ser. No. 07/871,364 filed on Apr. 20, 1992.

FIELD OF THE INVENTION

This invention relates to zero volt switching power converters.

BACKGROUND OF THE INVENTION

An important aspect of modern power supply design is the need to increase the power density of the power supply since many power applications involve locations in which the size of the power supply relative to its power output is restricted by space considerations. The power train and control circuits in addition to being highly compact must also have high overall efficiency to limit heat creating power dissipation. An illustrative application of a high density power supply is an off-line power supply used to power a laptop computer or similar appliance. Bridge type converters are suitable for such applications since they may be designed to operate resonately, which is an operational mode permitting a very high power density and high power efficiency.

The power switching transistors in a half bridge converter have an applied voltage stress half that of the switching transistors in a push-pull converter of comparable power handling capability. Hence the half bridge converter is especially suitable for high input voltage applications such as power converters powered directly from a rectified AC power line or from a power factor correction boost converter powered off the AC line.

Synchronous rectifiers are used in power supplies requiring high efficiency since they have little loss in operation. Proper drive circuits must be provided to drive the synchronous rectifier devices. Power supplies are often connected in parallel and without proper drive arrangements a synchronous rectifier of a failed power supply may be improperly biased into operation allowing a reverse feed to power into the power supply.

SUMMARY OF THE INVENTION

A bridge topology power converter, embodying the principles of the invention, and operating in a resonant mode of operation is used as an off-line switching power supply operating with a high power density. A novel drive arrangement and operative scheme for driving the power switching transistors limits the dissipation losses within the power switching transistors. Two switching transistors are connected in a half-bridge configuration. Drive circuitry drives the two power switching transistors with unequal duty cycles having conducting durations such that the sum of the conduction intervals substantially equals the combined switching period of the two power switching transistors. These conducting intervals are separated by very short dead time intervals controlled by the differing turn-on and turn-off times of the two power switching transistors. The short interval between alternate conductions of the two power switching transistors is sufficient in duration to allow zero voltage turn on of the power switching transistors but short enough in duration to minimize power loss and conducted noise. In the illustrative embodiment the dead time is at least an order of magnitude less than the time interval of the shortest duty cycle. Regulation of the output of the converter is attained by adjusting the ratio of the first and second duty cycles or conducting intervals.

Another aspect of the invention is a synchronous rectifier with highly efficient operation. MOSFET rectifying devices are driven with zero voltage switching so that the charging and discharging of the MOSFET gate capacitances are lossless.

BRIEF DESCRIPTION OF THE DRAWING

In the drawing:

FIG. 5 shows switching voltage waveforms of the power switches to assist in explaining the operation of the converter;

FIG. 8 shows voltage waveforms to assist in explaining the operation of the integrated magnetics.

DETAILED DESCRIPTION

Figure 1:
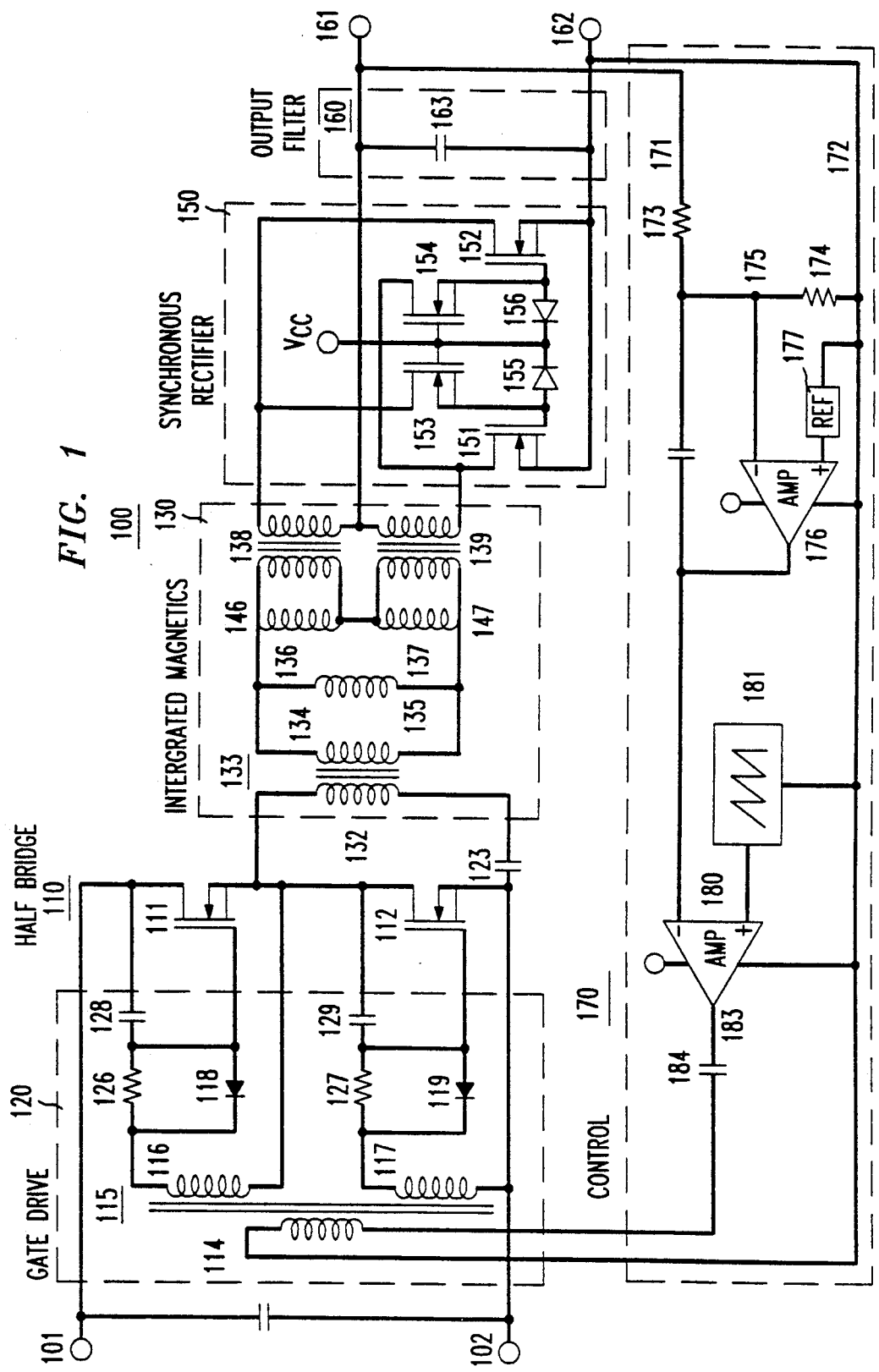
FIG. 1 is a schematic of a bridge type power converter embodying the principles of the invention.

A schematic of a DC to DC converter embodying the principles of the invention is shown in the FIG.1. The converter 100 includes a half bridge power switching circuit 110, an integrated magnetics processing circuit 130, a synchronous rectifier 150, an output 160, and a control circuit 170.

Input power is applied to the input terminals 101 and 102. This input power may in the instant circuit be provided by a power factor boost converter connected to to be energized by AC line voltage via a rectifier circuit. This input power is processed by the two power switches 111 and 112 (FET power switches in the illustrative embodiment), connected in a half bridge arrangement, and coupled to the primary winding 132 of the transformer 133. Primary winding 132 is connected in series circuit with a capacitor 123. This series circuit is connected in parallel with the power switch 112. The average voltage across capacitor 123 is the same as the average voltage across the power switch 112. The secondary winding 134 of the power transformer 133 is connected, via a ripple canceling magnetic circuit including the inductors 135, 136 and 137, and the transformers 138 and 139 to a synchronous rectifier 150. Two FET rectifier devices 151 and 152 are connected to supply a rectified voltage to the output filter 160. The converter's DC voltage output is provided at the output terminals 161 and 162.

The DC output voltage of the converter at terminals 161 and 162 is sensed by the control circuit 170 and applied via leads 171 and 172 to a voltage divider comprising resistors 173 and 174. The divided voltage at a center node 175 of the divider is connected to an inverting input of an opamp 176. A reference voltage 177 is connected to its non-inverting input. The output of opamp 176 is a control error voltage which is representative of the deviation of the DC output voltage of the converter at terminals 161 and 162 from some preselected regulated voltage value.

The control error voltage is applied to the inverting input of a comparator 180. A periodic ramp voltage is applied to the non-inverting input by a ramp generator 181. The output of the comparator 180, on lead 183, is a rectangular voltage waveform with finite rise and fall times. Its duration or duty cycle (i.e. fraction of the voltage high with respect to the period) is controlled by the amplitude of the control error voltage.

Figure 2:
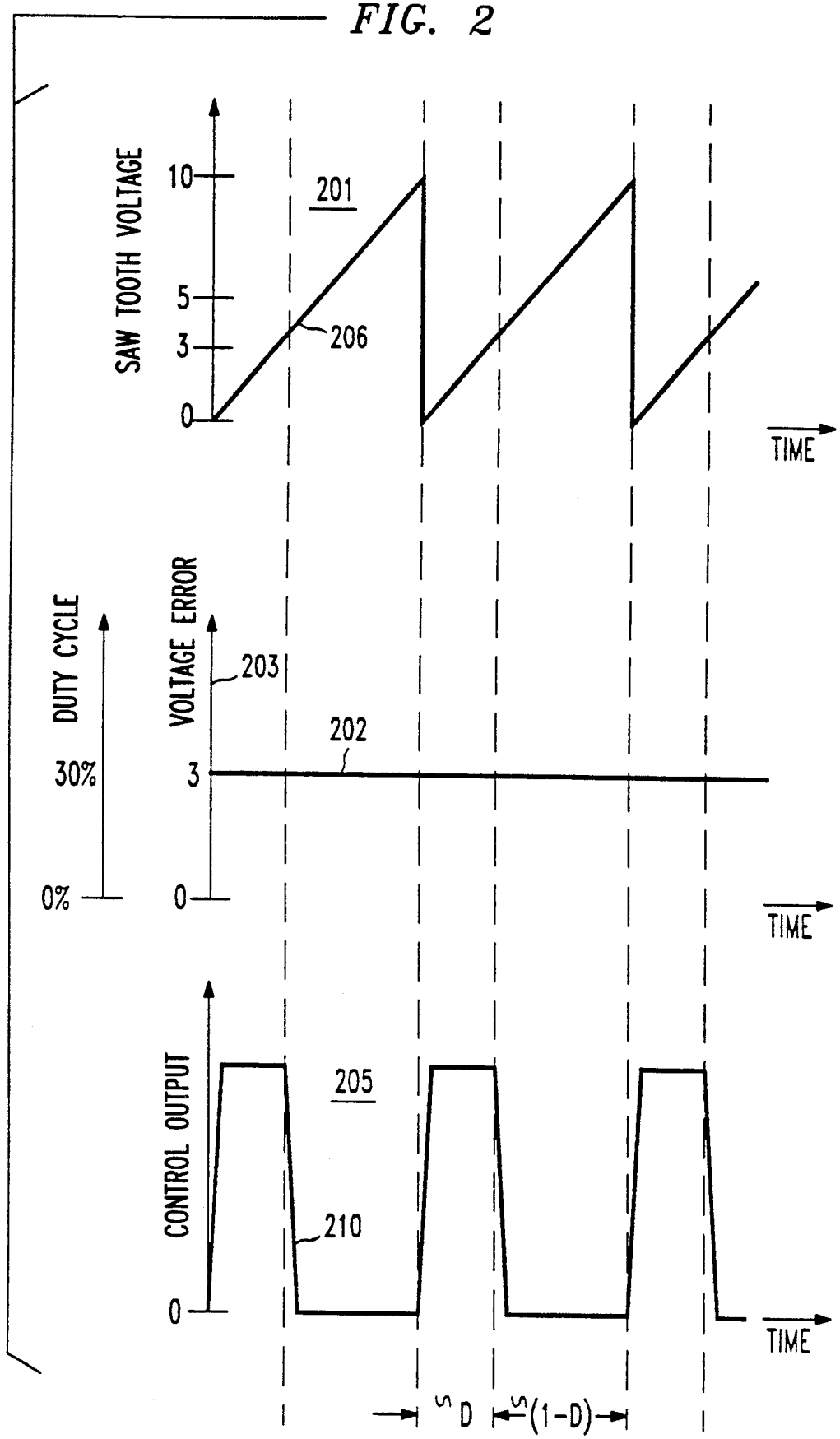
FIG. 2 is a waveform diagram of voltage waveforms to assist in explaining the operation of the converter.

A typical sawtooth waveform 201 supplied by the ramp generator is shown in the FIG. 2. A typical control error voltage level (i.e. its ordinate) is shown by the amplitude mark 202 on the vertical axis 203 of FIG. 2. The control output voltage of the comparator is a pulse signal with finite rise and fall times as shown by the waveform 205 in FIG. 2. Its high value duration (D) is governed by the time interval necessary for the positive sloped ramp 206 of waveform 201 to attain the value of the ordinate 202 of the error voltage level. Subsequently the output of the comparator is a low level for the remaining duration (1−D) of the increasing ramp waveform. The period of the ramp waveform (1) determines the period of operation of the converter. The respective conduction intervals as shown by the pulse 210 and intervening low states are of substantially different durations. The two power switches are enabled for unequal durations (D and 1−D) which differ substantially as shown by the waveform 205. The ratio of these two unequal durations are altered in response to the control error voltage in order to achieve regulation of the output voltage.

The waveform (205) generated by the comparator 180 is coupled, via lead 183 and capacitor 184, to the primary winding 114 of a transformer 115 of a gate drive 120. The capacitance of capacitor 184 is selected to block the DC portion of waveform 205 while leaving the pulse wave shape substantially unchanged.

Figure 3:
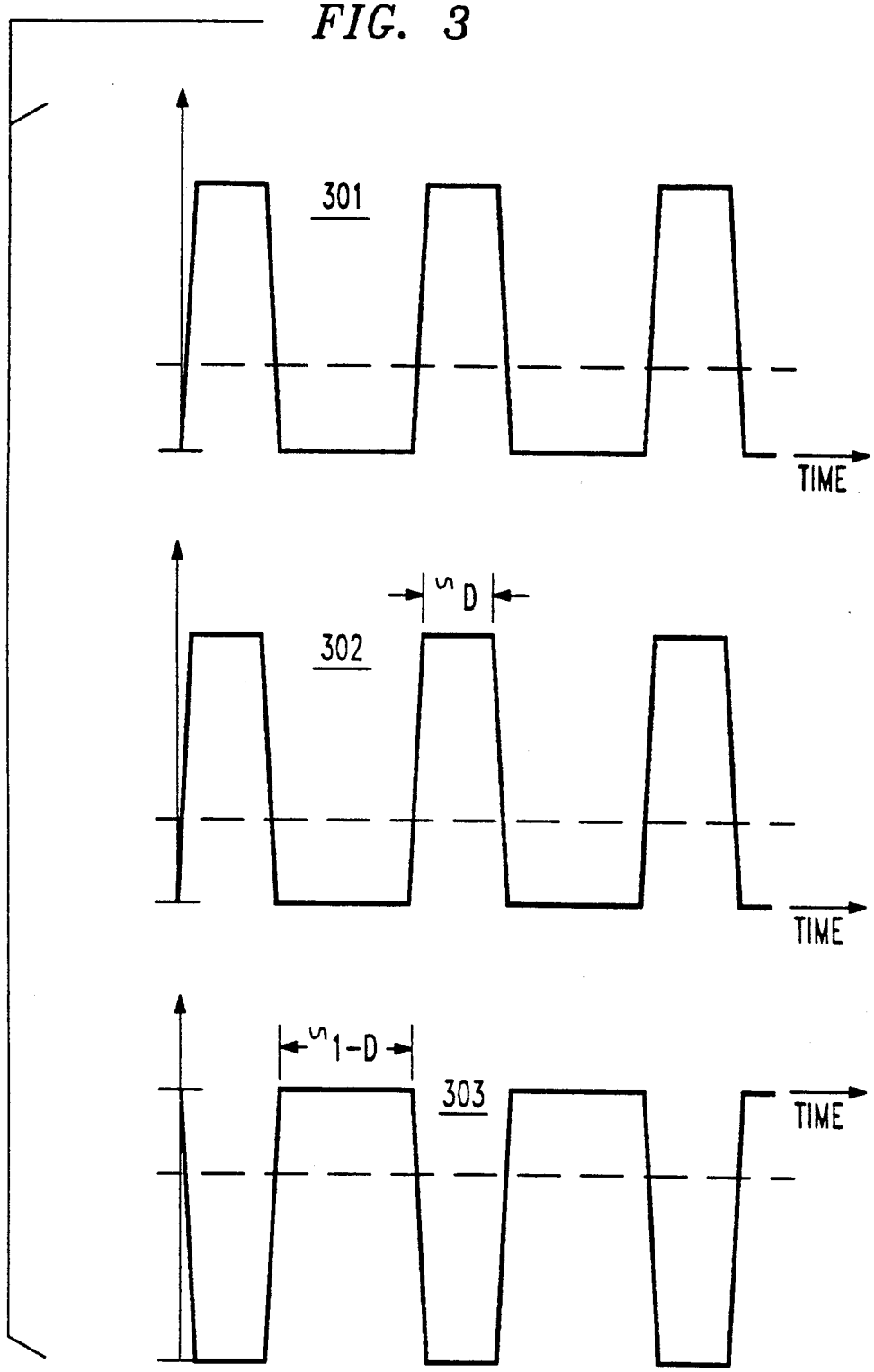
FIG. 3 shows representative gate voltage drive waveforms of the power switches to assist in explaining the operation of the converter.

The gate drive 120, shown in FIG. 1, includes the input transformer 115 having its primary winding 114 connected to receive the pulse waveform 205 (also shown as voltage waveform 301 in FIG. 3). The pulse waveform 205 is coupled to the two secondary windings 116 and 117 having winding orientations to supply voltages on these windings inverted in polarity relative to each other. These opposite polarity voltages are applied to the gate drive resistors 126 and 127, respectively. The pulse waveform applied to the gate resistor 126 is substantially identical to the waveform 205 shown in FIG. 2, while the waveform applied to the gate resistor 127 is the inverse of the waveform 205 (i.e. out of phase with the waveform 205). The respective duty cycles of the two switches do not take up the full allotted period due to the finite rise and fall times of the oppositely phased pulses.

Waveform 302 of FIG. 3 is the output of secondary winding 116 of the transformer 121. Waveform 303 of FIG. 3 is the output of secondary winding 117 of the transformer 121. The waveform 302 is in phase with the control waveform 301 and the waveform 303 is out of phase. The high state portions of the waveforms 302 and 303 drive the FET power switches 111 and 112 into their individual conduction states for the duration of the waveforms high state. Power switches 111 and 112 are conductive during opposing phase intervals and for the differing durations (D and 1−D).

The circuitry associated with each of the FET power switches is designed to apply a controlled time delay to the initial rise of the applied gate-source drive waveform. In the drive circuit for the FET power switch 111, the drive signal is applied via the secondary winding 116 of the transformer 115, a resistor 126, and a capacitor 128. The slewing of the voltage across FET power switch 111 causes current to flow through capacitor 128. This current causes a voltage to be developed across resistor 126, this voltage reduces the gate voltage of the FET power switch 111 and thereby operates to delay the rise time of the gate signal until the drain-to-source voltage, of FET power switch 111, reaches a minimum value. This drop to a minimum value occurs as a result in part to the effects of the leakage inductance of the transformer 133 as well as the effects of the magnetizing current of the transformer 133. This minimum voltage is limited by the clamp voltage of the parasitic diode of the FET power switch.

As the drain-to-source voltage of the FET power switch 111 is falling, current is drawn through the series resistor 126 and capacitor 128 delaying the rise time of the gate-to-source voltage (shown by waveform 401 in FIG. 4) until the drain-to-source voltage reaches its minimum value. Hence a small time delay (shown by time increment 403 in FIG. 4) occurs between the turn-off of the FET power switch 112 and the turn-on of the FET power switch 111. The FET power switch 111 is then turned-on at the minimum value of the drain-to-source voltage thereby minimizing the turn-on loss.

The drive circuit for the FET power switch 112 is energized by the output of the secondary winding 117 of the transformer 115. It includes a series connected resistor 127 and a capacitor 129. This series circuit operates, as described above with relation to application of the drive to the FET power switch 111, to delay rise of the gate-to-source voltage (shown by wavedorm 402 in FIG. 4) at the gate of the FET power switch 112 until its drain-to-source voltage reaches a minimum value. (delay shown by time increment 404 in FIG. 4)

In each drive circuit the values of resistance for each of the resistors (126, 127) and values of capacitance for each of the capacitors (128, 129) is selected so that the current through the drain-to-source parasitic capacitor of the FET power switch develops a voltage sufficient to hold the gate-to-source-voltage below the turn-on threshold voltage value.

$$V_{drive} - I^*R < V_{threshold} \quad (1)$$

The current is a function of the slew rate of the drain-to-source voltage and of the capacitance value.

$$I = C^*dv/dt \quad (2)$$

The capacitors 128 and 129 are sized and added to augment the already existing Miller capacitance which by itself is not sufficient to supply the needed capacitance value. The resistance value of the resistors 126 and 127 must be low in value to assure a fast rise in gate voltage when the capacitor current goes to zero value. The diodes 118 and 119 are added to provide a low impedance path for turn-off signals and enhance the turn-off efficiency of the power switches.

As described above the FET power switches 111 and 112 are driven out of phase with each other with a small dead time between unequal conducting intervals (D and 1−D) of the two power switches. The dead time occurring between the conducting intervals of the two switches is critical to the minimization of the switching losses.

If the switching period of the power converter is defined as unity (i.e. "1") the power switch 111 has a conduction duty cycle of "D" and the power switch 112 has a conduction duty cycle of "1−D". The voltage across the power switch 112 (as shown by waveform 501 in FIG. 5) is approximately zero volts for the substantially all of the "1−D" fraction of the switching period and equal to the input voltage Vin for substantially all of the remaining "D" fraction of the switching period. These voltage relations are clearly illustrated in the FIG. 5 wherein waveform 501 represents the voltage across the power switch 112 and the voltage waveform 502 represents the voltage applied to the primary winding 132 of the transformer 133. Waveform 503 represents the voltage across the capacitor 123 connecting the primary winding 132 to the return lead 138 connected to input lead 102. This voltage, shown by waveform 503, is substantially equal to the product of the interval "D" and the input voltage Vin. The average voltage across the primary winding 132 is zero for this switching period.

Figure 4:
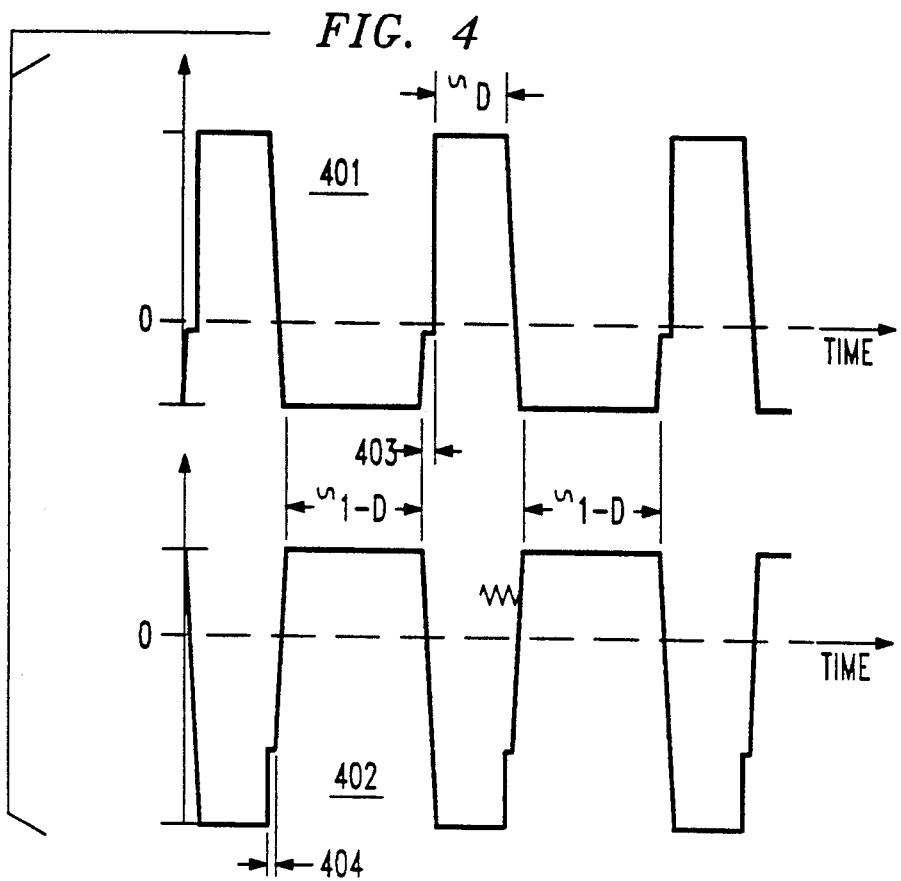
FIG. 4 shows switching voltage waveforms of the power switches of the half bridge to assist in explaining the operation of the converter.

During the dead times 505 and 506 shown in FIG. 4, the leakage energy of the transformer 133 resonates with the parasitic capacitances of the power switches 111 and 112 forcing the voltage across a power switches to zero volts just prior to its turn-on. In addition to the leakage energy, the transformer magnetizing current acts to force the voltage across the power switches to zero volts just prior to turn-on. The inductive energy of transformer 133 forces its voltage to reverse when current flow is interrupted at the end of the conduction interval of the transistor switch 111 during the dead time 505. This transformer voltage reversal forces the voltage across transistor switch 112 toward a zero voltage value. Zero voltage switching is attained for the transistor switch 112 when the inductive energy is sufficient to force the voltage across transistor switch 112 to zero voltage before the start of the conduction interval "1−D". Similarly zero voltage switching for the transistor switch 111 is attained during the dead time 506 at the end of the conduction interval for transistor 112.

Values needed for the magnetizing energy and leakage energy of transformer 133 in order to achieve zero voltage switching are dependent on the impedance of the converters secondary circuitry. In the present example (a half bridge buck type converter) the zero voltage switching is attained by setting the magnetizing current larger than the reflected output current or by setting the leakage energy larger than the energy needed to discharge the parasitic capacitances of the transistor switches 112 and 112.

During conditions of low output current, the effects of magnetizing current is dominant. During conditions of high output current, the effects of leakage energy is dominant. Zero volt switching may be obtained for the full range of output current by maximizing of both magnetizing current and leakage energy. This zero volt turn-on transition timing is obtained by the automatic adjustment of the dead time value through the novel gate drive circuit. The attainment of zero volt turn-on transitions minimizes power loss, and limits radiated and conducted noise.

Figure 6:
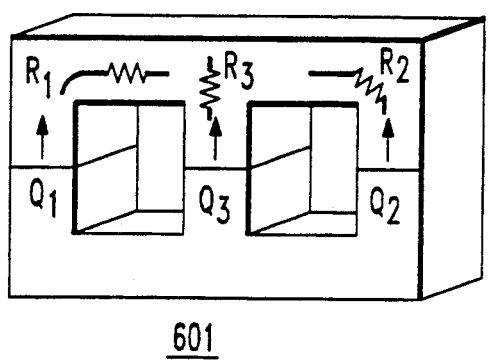
FIG. 6 shows a magnetic model of integrated magnetics used in the converter.
Figure 7:
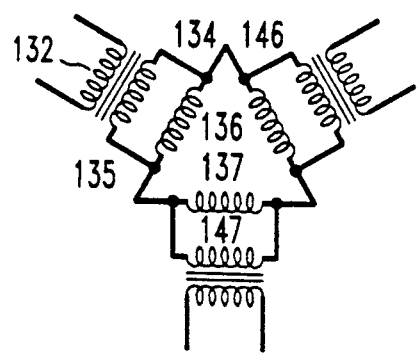
FIG. 7 shows an electrical model of integrated magnetics used in the converter.

In order to prevent the transformer 133 from saturating during operation of the converter due to the unsymmetrical drive applied to it, its core is typically gapped to accommodate the high magnetizing currents. The transformer 133 and the inductances 135, 136, and 137 are constructed in an integrated form. The equivalent magnetic core model 601 is shown in FIG. 6 and is the equivalent of a three leg magnetic core structure. The equivalent electrical model 701 shown in FIG. 7 and in FIG. 1 of the actual circuit includes a delta connected loop of three inductors 135, 136 and 137. The coupling of the transformer windings 134, 146 and 147 to each inductor 135, 136 and 137, respectively, is shown and is equivalent to the circuit arrangement of the integrated magnetics circuit 130 shown in the FIG. 1.

The integrated magnetics circuit 130 provides three reluctance paths for output current. During a first phase of the switching cycle the current output flows through the winding 146 which has the inductance 136. Current in the other half cycle flows through the winding 147 and its inductance 137. Since the respective duty cycles (D, and 1−D) are unequal the ripple currents are out of phase and cancel each other and hence the resultant ripple current is less than the ripple in any one of the inductors. If a particular operating point is predominant the values of the inductors 135, 136 and 137 may be specifically selected so that all the ripple currents are substantially canceled at the operating point when the ratio of the output inductances equals the ratio of the oppositely phased duty cycles. If the ratio of the inductances is selected to equal the voltages applied to them the current are out of phase and sum to zero and the ripple current is zero.

By properly selecting selecting values for inductors $L_1$ and $L_2$, the ripple can be made to cancel at a defined load. where $L_1$ is inductor 136 and $L_2$ is inductor 137. For the D portion of the cycle;

$$V_{L1} = V_{out} \tag{3}$$

and for the (1−D) portion of the cycle;

$$V_{L1}/V_{L2} = D/(1-D) \tag{4}$$

Hence during the entire switching cycle the expression (6) substantially defines the voltage ratio across the inductors;

$$V_{L1}/V_{L2} = L_1/L_2 \tag{5}$$

These currents hence exactly cancel at the operating point when:

$$L_1/L_2 = D/(1-D) \tag{6}$$

During the interval of conduction of the FET power switch 112 the secondary inductor 137 of the integrated magnetics circuit 130 is connected to the output terminals 161, 162, via FET rectifier 151 of the synchronous rectifier circuit 150. The balance of the secondary voltage appears across the inductor 136. During the opposite phase of the conduction interval of FET power switch 111 the secondary inductance 136 is connected across the output voltage terminals 161, 162 through the synchronous rectifier switch 152. The remainder of the output voltage is developed across the secondary inductor 137.

The voltage waveforms of the integrated magnetics circuit are shown in the FIG. 8 The voltage waveform 803 is representative of the voltage across the secondary inductor 137 and the voltage waveform 802 is representive of the voltage across the secondary inductor 136.

Voltage waveform 801 is representative of the voltage across the primary winding 132 of the transformer 133. The steady state output voltage of the converter at the output leads 161 and 162 may be readily ascertained by equating the volt seconds across the two inductances during the opposite phases of operation.

A driven synchronous rectifier 150 (shown in FIG. 1) utilizes two MOSFET rectifying devices 151 and 152. Drive for these rectifying devices 151 and 152 is supplied by the drive MOSFETs 153 and 154, respectively. To assure proper timing of drive signals the gate electrode of each MOSFET rectifier device, 151 and 152, is driven in response to the drain voltage of the other MOSFET rectifier device, 152 and 151, respectively. A voltage for disabling one of the MOSFET rectifying devices is not generated until the other rectifying device is not conducting. Hence, neither of the MOSFET rectifying devices is turned on until its parasitic diode is conducting. As a result switching is at a substantially zero voltage thereby substantially eliminating switching loss in the MOSFET rectifying devices.

An IC enabling level voltage $V_{cc}$ is applied to the terminal 157 for controlling the proper operating voltage levels for the MOSFET rectifying devices, 151 and 152, and their drive MOSFETs, 153 AND 154. Gate drive energy for the rectifying devices is obtained from the power train during the turn on transition and returned to the power train during the turn off transition. The gate drive MOSFETS 153 and 154 also switch at substantially zero volts thereby substantially eliminating switching loss in the gate drive MOSFETs 153 and 154. Operation of the synchronous rectifier 150 is disabled by removing the voltage $V_{cc}$ from the terminal 157.

Assuming that the MOSFET rectifying device 152 is conducting, its drain voltage is approximately zero volts and the drive MOSFET 153 is on. The gate voltage of the MOSFET rectifying device 151 is approximately zero volts and its drain voltage is equal to the voltage of the transformer. Device 151 is turned off. The drive MOSFET 154 is also off and the gate voltage of MOSFET rectifying device 152 is high.

As the transformer voltage reverses, in response to a power switch switching transient, the drain voltage of the MOSFET rectifying device 151 falls toward zero volts. As this voltage falls the parasitic drain-to-source diode of the drive MOSFET 154 turns on and in turn turns drive MOSFET 154 on. With drive MOSFET 154 on the voltage of the gate of the MOSFET rectifying device 152 drops to zero volts and it turns off. The drain-source voltage of the MOSFET rectifying device 151 drops to zero.

The reversed transformer voltage is applied to the parasitic drain-to-source parasitic diode of the MOSFET rectifying device 151. Since drive MOSFET 154 is on the drain voltage of MOSFET rectifying device 152 increases, and the MOSFET rectifying device 151 is quickly turned on. As the drain voltage of MOSFET rectifying device increases the drive MOSFET 154 turns off and the MOSFET rectifying device is biased fully on.

Two diodes, connecting the gates of MOSFET devices 151 and 152 to the terminal 157, are provided in the synchronous rectifier 150 to clamp the voltage spikes flowing through the parasitic diodes of the drive MOSFETs 153 and 154. They additionally provide a low impedance path at the gates of the MOSFET rectifying devices 151 and 152 when the gate drive is disabled.

The current flowing in the output capacitor 163, shunting the output leads 161 and 162, equals the sum of the currents flowing in the inductors. The output voltage is given by the expression of equation (7) herein below;

$$V_{out} = D*(D-1)*V_{in}*(N_s/N_p) \qquad (7)$$

While the foregoing converter has been described with respect to an off-line converter normally operating with power factor enhancement circuitry at its input it is to be understood that the principles of the invention may readily be applied to converters operated without power factor correction.

I claim:

1. In a converter circuit, including:
   first and second power switches,
   a power transformer having a primary winding connected to the first and second power switches and a secondary winding;
   a rectifier circuit connected to the secondary winding and comprising;
   a synchronous rectifier including:
   first and second oppositely phased synchronous rectifying devices, each controlled in response to signals applied to a control electrode;
   control circuitry for applying control signals to the control electrode of each of the first and second synchronously rectifying devices, including;
   first and second drive devices each interconnecting a first main power flow terminal of the first and second synchronous rectifying devices to a control electrode of the second and first synchronous devices, respectively, a second main power flow terminal of the first and second synchronous devices connected together, and
   an input voltage terminal for accepting a control voltage enabling operation of the synchronous rectifier.

2. In a converter circuit as claimed in claim 1, further including:
   first and second diodes connected to control electrodes of the first and second synchronous rectifiers and
   to control electrodes of the first and second drive devices and connected to clamp switching transients of the drive devices.

3. In a converter circuit as claimed in claim 2, further including:
   the input voltage terminal being connected to a common node joining control electrodes of the first and second drive devices and joining electrodes of the first and second diodes.

4. In a converter circuit, including:
   first and second power switches, and control means to alternately drive the first and second power switches with a minimum of nonconducting time between conducting intervals of the first and second power switches;
   a power transformer having a primary winding connected to the first and second power switches and a secondary winding;
   a rectifier circuit connected to the secondary winding and comprising;
   a synchronous rectifier including:
   first and second oppositely phased synchronous rectifying devices, each controlled in response to signals applied to a control electrode;

control circuitry for applying control signals to the control electrode of each of the first and second synchronously rectifying devices, including;

first and second drive devices each interconnecting a main power flow terminal of the first and second synchronous rectifying devices to a control electrode of the second and first synchronous devices, respectively; and an input voltage terminal for accepting a control voltage enabling operation of the synchronous rectifier.

5. In a converter circuit as claimed in claim 4, further including:

first and second diodes connected to control electrodes of the first and second synchronous rectifiers and to control electrodes of the first and second drive devices and connected to clamp switching transients of the drive devices.

6. In a converter circuit as claimed in claim 5, further including:

the input voltage terminal being connected to a common node joining control electrodes of the first and second drive devices and joining electrodes of the first and second diodes.

7. A bridge type power converter in which conduction/non-conduction transitions of its power switching transistors occur at zero voltage, comprising:

an input circuit for accepting a source of energy;

first and second power switching transistors connected in series circuit and the series circuit connected in shunt with the input circuit; a first conducting interval of the first power switching transistor being substantially less in duration than a second conducting interval of the second power switching transistor, a power transformer having a primary winding connected to a common node joining the first and second power switching transistors, and a secondary winding;

a rectifier circuit connected to the secondary winding for rectifying the voltage output of the secondary winding;

an output circuit for coupling the rectified voltage of the rectifier circuit to a load to be energized;

wherein the improvement comprises:

the rectifier circuit comprising a synchronous rectifier including:

first and second oppositely phased synchronous rectifying devices, each controlled in response to signals applied to a control electrode;

control circuitry for applying control signals to the control electrode of each of the first and second synchronously rectifying devices, including;

first and second drive devices each interconnecting a main power flow terminal of the first and second synchronous rectifying devices to a control electrode of the second and first synchronous devices, respectively; and an input voltage terminal for accepting a control voltage enabling operation of the synchronous rectifier.

8. A bridge type power converter, as claimed in claim 7; comprising:

first and second diodes connected to control electrodes of the first and second synchronous rectifiers and to control electrodes of the first and second drive devices and connected to clamp switching transients of the drive devices.

9. A bridge type power converter, as claimed in claim 8; comprising:

the input voltage terminal being connected to a common node joining control electrodes of the first and second drive devices and joining electrodes of the first and second diodes.

* * * * *